United States Patent
Rosas Roman et al.

(10) Patent No.: US 9,464,657 B2
(45) Date of Patent: Oct. 11, 2016

(54) RETAINER, RETAINING ASSEMBLY, AND RETAINING METHOD

(71) Applicants: GM GLOBAL TECHNOLOGY OPERATIONS LLC, Detroit, MI (US); ALPHA STAMPING COMPANY, Livonia, MI (US)

(72) Inventors: Diego Fernando Rosas Roman, Estado de Mexico (MX); Robert Stewart, Farmington Hills, MI (US)

(73) Assignees: GM Global Technology Operations LLC, Detroit, MI (US); Alpha Stamping Company, Livonia, MI (US)

( * ) Notice: Subject to any disclaimer, the term of this patent is extended or adjusted under 35 U.S.C. 154(b) by 93 days.

(21) Appl. No.: 14/275,952

(22) Filed: May 13, 2014

(65) Prior Publication Data

US 2015/0329065 A1 Nov. 19, 2015

(51) Int. Cl.
  *F16B 37/02* (2006.01)
  *F16B 37/06* (2006.01)
  *F16B 37/04* (2006.01)
  *F16B 37/08* (2006.01)

(52) U.S. Cl.
  CPC .............. *F16B 37/065* (2013.01); *F16B 37/02* (2013.01); *F16B 37/041* (2013.01); *F16B 37/0842* (2013.01); *Y10T 24/30* (2015.01); *Y10T 29/49828* (2015.01)

(58) Field of Classification Search
  CPC .................................................. B60R 13/0206
  USPC .................................... 411/173, 113; 24/258
  See application file for complete search history.

(56) References Cited

U.S. PATENT DOCUMENTS

| | | | | |
|---|---|---|---|---|
| 2,275,773 A | * | 3/1942 | Kost | F16B 21/20 411/173 |
| 2,406,415 A | * | 8/1946 | Tinnerman | F16B 37/043 411/173 |
| 2,426,799 A | * | 9/1947 | Tinnerman | F16B 37/043 411/173 |
| 2,616,142 A | * | 11/1952 | Tinnerman | F16B 2/241 24/458 |
| 2,627,294 A | * | 2/1953 | Bedford, Jr. | F16B 37/044 411/112 |
| 3,189,076 A | * | 6/1965 | Adams | F16B 37/043 411/113 |
| 3,315,721 A | * | 4/1967 | Koehl | F16B 37/044 411/113 |
| 4,850,773 A | * | 7/1989 | Asami | F16B 9/023 24/297 |

\* cited by examiner

*Primary Examiner* — Gary Estremsky
(74) *Attorney, Agent, or Firm* — Quinn Law Group, PLLC

(57) ABSTRACT

A retainer can couple at least two components together and includes a retainer body defining a body opening and at least one leg extending from the retainer body. The leg can bend relative to the retainer body between a first position and a second position upon application of an external force. The leg includes a connection portion coupled to the retainer body, a support portion coupled to the connection portion, and a bendable portion interconnecting the connection portion and the support portion. The bendable portion can bend such that the leg can move relative to the retainer body between the first and second positions. When the leg is in the first position, the support portion is obliquely angled relative to the retainer body. When the leg is in the second position, the support portion is substantially parallel to the retainer body.

16 Claims, 3 Drawing Sheets

RETAINER, RETAINING ASSEMBLY, AND RETAINING METHOD

TECHNICAL FIELD

The present disclosure relates to a retainer, retaining assembly, and retaining method.

BACKGROUND

Retainers are used to couple at least two components together. For example, in vehicles, such as cars, a retainer can be used to couple one component, such as fastener, in a fixed position relative to another component, such as a panel.

SUMMARY

It is useful to develop a retainer capable of fixing the position of a first component relative to a second component. In an embodiment, the retainer can couple at least two components together and includes a retainer body defining a body opening and at least one leg extending from the retainer body. The leg can bend relative to the retainer body between a first position and a second position upon application of an external force. The leg includes a connection portion coupled to the retainer body, a support portion coupled to the connection portion, and a bendable portion interconnecting the connection portion and the support portion. The bendable portion can bend such that the leg can move relative to the retainer body between the first and second positions. When the leg is in the first position, the support portion is obliquely angled relative to the retainer body. When the leg is in the second position, the support portion is substantially parallel to the retainer body.

The present disclosure also relates to a retaining assembly. In an embodiment, the retaining assembly includes a fastener and a panel. The panel includes a panel body, which in turn defines an inner panel surface. The inner panel surface defines a panel opening extending through the panel body. The panel opening at least partially receives the fastener. The retaining assembly further includes a retainer described above. The retainer interconnects the panel and the fastener. The panel opening is sized to receive the support portion and the connection portion when the leg is in the first position. On the other hand, when the leg is in the second position, the inner panel surface surrounds the connection portion and the panel body may rest on the support portion and is disposed between the support portion and the retainer body.

The present disclosure also relates to a retaining method for retaining a fastener in place relative to a panel using a retainer described above. The panel has the features described above. In an embodiment, the retaining method includes the following steps: (a) advancing the leg through the panel opening until the inner panel surface surrounds the connection portion of the leg; (b) bending the leg from the first position to the second position, wherein the panel is trapped between the retainer body and the leg when the leg is in the second position; and (c) moving the retainer toward the fastener such that the shaft of the fastener extends through the body opening.

The above features and advantages and other features and advantages of the present invention are readily apparent from the following detailed description of the best modes for carrying out the invention when taken in connection with the accompanying drawings.

DETAILED DESCRIPTION

Figure 1:
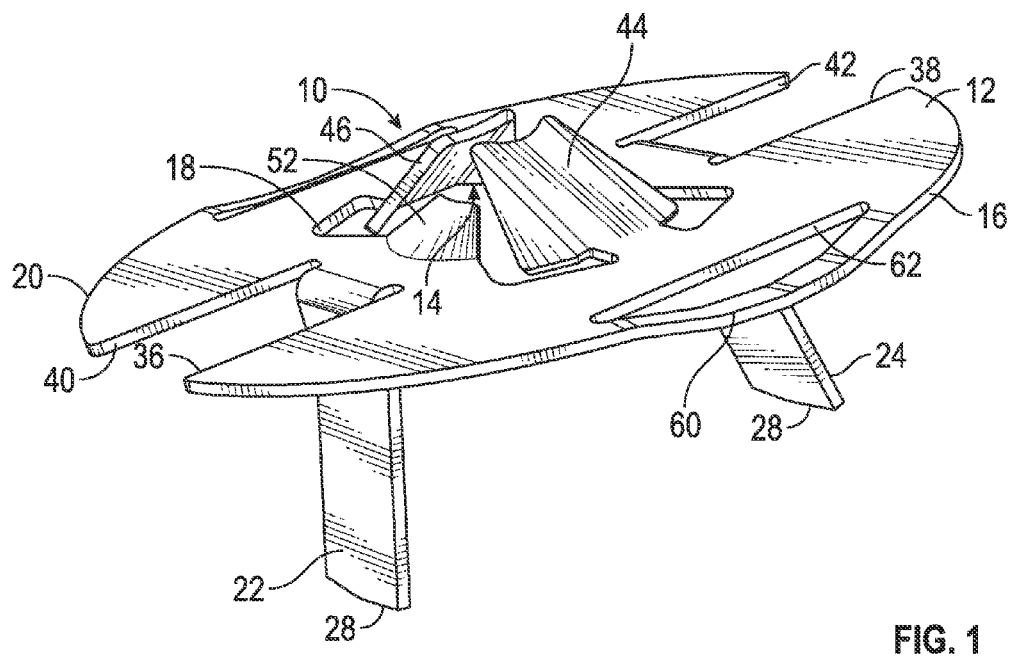
FIG. 1 is a schematic, perspective view of a retainer.
Figure 2:
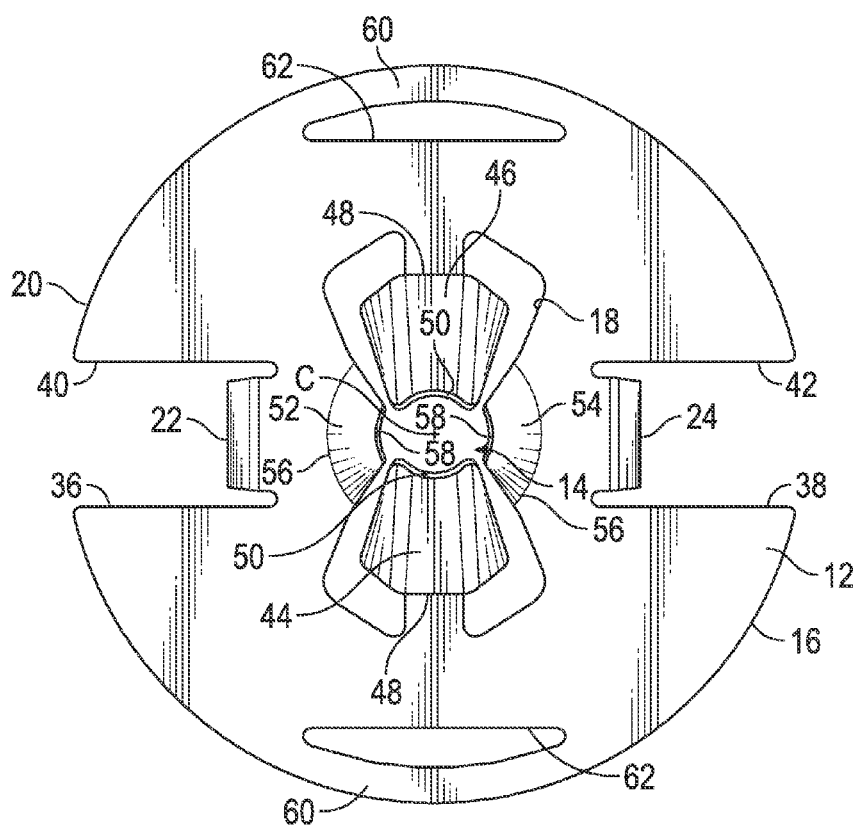
FIG. 2 is a schematic, top view of the retainer shown in FIG. 1.

Referring to the drawings, wherein like reference numerals are used to identify like or identical components in the various views, FIGS. 1 and 2 schematically depict a retainer 10 capable of coupling at least two components together. In the depicted embodiment, the retainer 10 is a one-piece structure and may be wholly or partly made of a substantially rigid material, such as a suitable metal. Suitable metals include, but are not limited to, steel and aluminum. The retainer 10 includes a retainer body 12 and defines a body opening 14 extending through the retainer body 12. The retainer body 12 may have a substantially planar shape and may therefore be referred to as the substantially planar body or the planar body. In addition, the retainer body 12 may have a substantially circular shape and defines an outer body surface 16 and an inner body surface 18 opposite the outer body surface 16. The outer body surface 16 defines an outer perimeter 20 (e.g., circumference). The outer perimeter 20 may be a circumference. The inner body surface 18 defines the body opening 14, and the body opening 14 at least partially extends through the retainer body 12 at or near the center C defined by the retainer 10.

Figure 4:
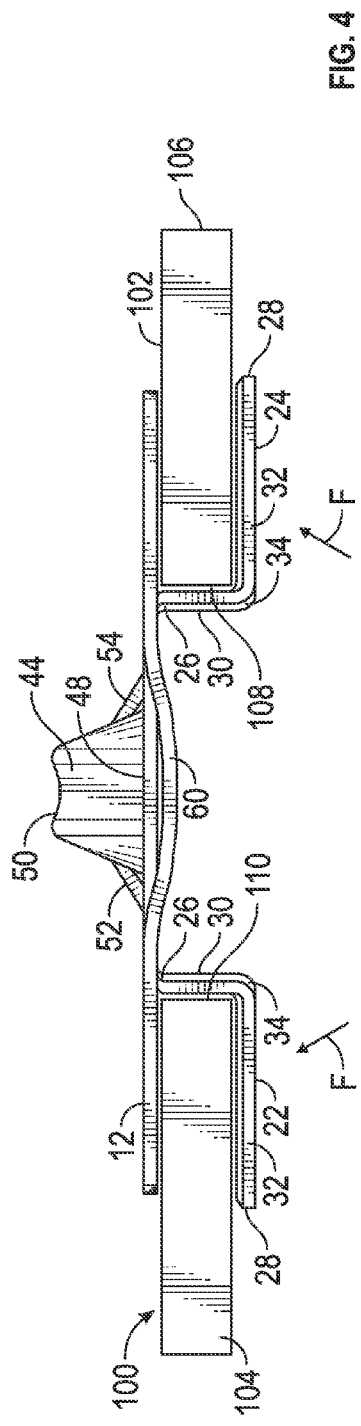
FIG. 4 is a schematic, side view of the retainer and the panel shown in FIG. 3, wherein the legs support the panel and are in a second position.
Figure 5:
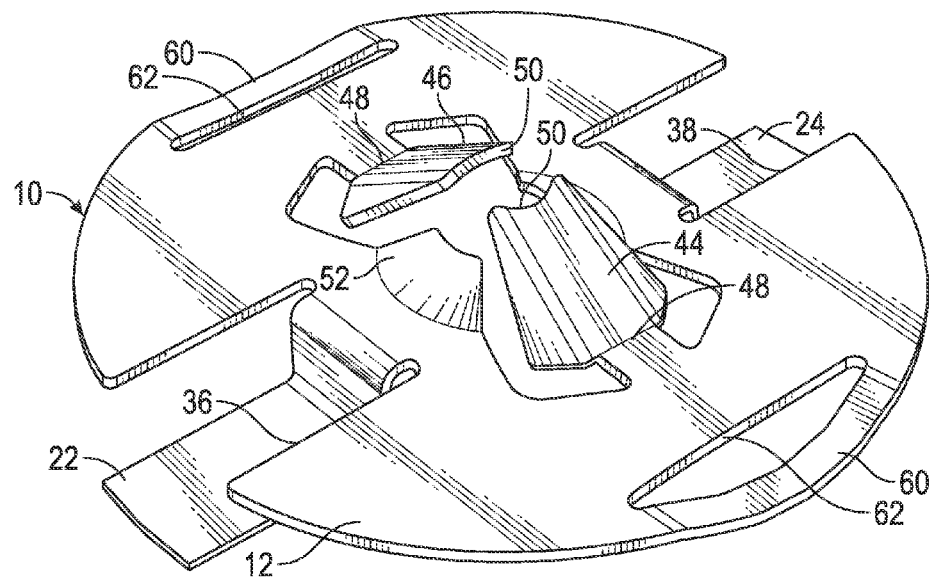
FIG. 5 is a schematic, perspective view of the retainer shown in FIG. 1, wherein the legs are in the second position.

The retainer 10 further defines at least one leg (e.g., first and second legs 22, 24) bendable relative to the retainer body 12 upon the application of an external force F (FIG. 4). In the depicted embodiment, the retainer 10 includes first and second legs 22, 24 movably coupled to the retainer body 12. Specifically, each of the first and second legs 22, 24 is bendable relative to the retainer body 12 between a first position (FIG. 1) and a second position (FIG. 4) upon application of an external force F (FIG. 4). For instance, applying the external force F (FIG. 4) to the first and second legs 22, 24 causes the first and second legs 22, 24 to bend relative to the retainer body 12 from the first position (FIG. 1) to the second position (FIG. 4). In the first position, at least part of the first and second legs 22, 24 may be obliquely angled relative to the retainer body 12. It is contemplated, however that the first and second legs 22, 24 may be perpendicular to the retainer body 12 when disposed in the first position. In the second position, at least parts of the first and second legs 22, 24 are substantially parallel to the retainer body 12 as discussed in detail below.

Figure 3:
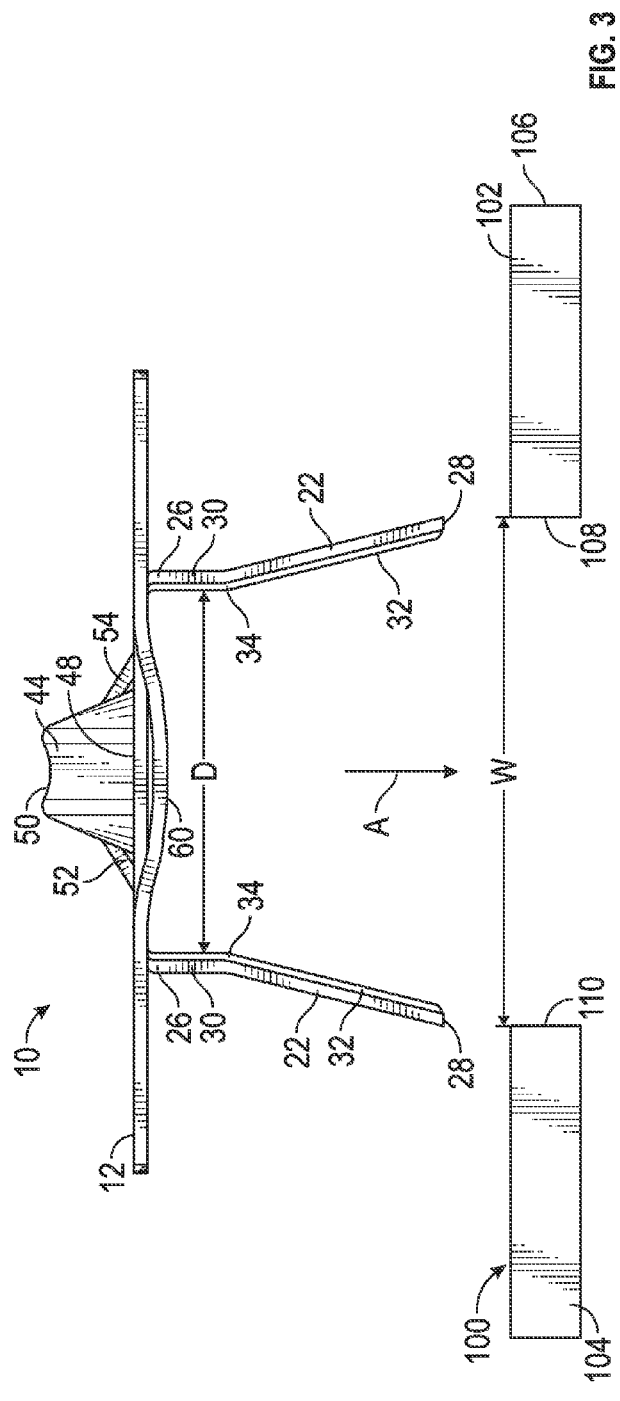
FIG. 3 is a schematic, side view of the retainer shown in FIG. 1 moving toward a panel, wherein the retainer includes a plurality of legs, and the legs are in a first position.

With reference to FIGS. 3 and 4, each of the first and second legs 22, 24 includes a first leg end 26 directly coupled to the retainer body 12 and a second leg end 28 opposite the first leg end 26. The second leg end 26 is free. In other words, the second leg end 26 is not attached to the retainer body 12 or any other portion of the retainer 10. Further, each of the first and second legs 22, 24 includes a connection portion 30 directly coupled to the retainer body 12, a support portion 32 configured to support a first component 100 when the first and second legs 22, 24 are in the second position, and a bendable portion 34 capable of bending when subjected to the external force F. As a non-limiting example, the first component 100 may be a panel 102. The support portion 32 and the connection portion 30 may have substantially planar shapes, while the bendable portion 34 may have a substantially curved shape. The connection portions 30 may be substantially perpendicular to the retainer body 12 regardless of whether the first and second legs 22, 24 are in the first position or the second position. The support portions 32, on the other hand, are obliquely angled relative to the retainer body 12 when the first and second legs 22, 24 are in the first position (FIG. 3) and are substantially parallel to the retainer body 12 when the first and second legs 22, 24 are in the second position (FIG. 4). Each bendable portion 34 interconnects the connection portion 30 and the support portion 32. Further, the bendable portion 34 may be a bendable elbow and can bend when the first and second legs 22, 24 are subjected to the external force F. Accordingly, the support portions 32 can move (e.g., pivot) relative to the connection portions 30 when the external force F is applied to the first and second legs 22, 24. The first and second legs 22, 24 then remain in the second position (FIG. 4) after the external force F is applied to them, thereby allowing the support portions 32 to support the first component 100 (e.g., panel 102). The support portions 32 can therefore support the first component 100 (e.g., panel 102) when the first and second legs 22, 24 are in the second position (FIG. 4). In other words, the first component 100 (e.g., panel 102) can rest on the support portions 32 of the first and second legs 22, 24 when the first and second legs 22, 24 are in the second position (FIG. 4). Thus, the first and second legs 22, 24 can support the panel 100 when positioned in the second position. The parallel arrangement of the support portions 32 and the retainer body 12 when the first and second legs 22, 24 are in the second position aids the retainer 10 support and hold the panel 102 (or any other first component 100). Further, the perpendicular orientation of the connection portions 30 relative to the retainer body 12 also helps the retainer 10 hold the panel 102 in place.

As discussed above, the first component 100 may be a panel 102. The panel 102 may have a substantially planar shape and includes a panel body 104. The panel body 104 defines an outer panel surface 106 and an inner panel surface 108 opposite the outer panel surface 106. The inner panel surface 108 defines a panel opening 110 (e.g., a hole) configured, shaped, and sized to receive the first and second legs 22, 24. Specifically, the panel opening 110 is configured, shaped, and sized to receive the connection portions 34 and the support portions 32 when the first and second legs 22, 23 are in the first position. When the first and second legs 22, 24 are in the second position (FIG. 4) and the support portions 32 are supporting the panel 102, the connection portions 30 are wholly or partly disposed in the panel opening 110. Also, when the first and second legs 22, 24 are in the second position, the panel body 104 may rest on the support portions 32 and is disposed between the support portions and the retainer body 12. The panel opening 110 has a width W (e.g., a diameter), and the distance from the connection portion 30 of the first leg 22 to the connection portion 30 of the second leg 24 is referred to as the distance D. The width W (e.g., diameter) of the panel opening 110 is greater than the distance D in order to allow the panel 102 to move slightly relative to the retainer 10 even when the panel 102 is trapped between the retainer body 12 and the support portions 32 when the first and second legs 22, 24 are in the second position.

With reference now to FIGS. 1-5, the retainer 10 further includes at least one leg receiving opening (e.g., first and leg receiving opening 36, 38). In the depicted embodiment, the retainer 10 defines a first leg receiving opening 36 and a second leg receiving opening 38. The outer body surface 16 defines a first surface portion 40 that defines the first leg receiving opening 36 and a second surface portion 42 that defines the second leg receiving opening 38. The first and second leg receiving openings 36, 38 may be configured as slots. Regardless of the specific configuration, each leg receiving opening 36, 38 is configured, shaped, and sized to receive at least one of the legs (i.e., the first leg 22 or the second leg 24) while allowing the first and second legs 22, 24 to move relative to the retainer body 12.

The retainer 10 further includes at least one engaging protrusion (e.g. first and second engaging protrusions 44, 46) extending from the retainer body 12 toward the center C of the retainer 10. In the depicted embodiment, the first and second engagement protrusions 44, 46 are configured as ramps and each define a first protrusion end 48 and a second protrusion end 50 opposite the first protrusion end 48. The first protrusion end 48 of each engaging protrusion (e.g., first and second engaging protrusions 44, 46) may be directly coupled to the retainer body 12, whereas the second protrusion end 50 is free. In other words, the second protrusion end 50 is not coupled to the retainer body 12 or any other portion of the retainer 10. The first and second engaging protrusions 44, 46 can contact a second component 200 extending through the body opening 14 in order to couple the second component 200 to the retainer 10. The second component 200 may be a fastener 202, such as a bolt or screw. In the depicted embodiment, the fastener 202 includes a head 204 and a shaft 206 extending from the head 204. The shaft 206 defines threads 208, such as helical threads, and the engaging protrusions 44, 46 can mate with threads 208 in order to couple the second component 200 (e.g., fastener 202) to the retainer 10. Specifically, the second protrusion end 50 of the first and second engaging protrusions 44, 46 engage the threads 208 of the shaft 206 disposed through the body opening 14, thereby coupling the fastener 202 to the retainer 10. The fastener 202 includes a tapered end 210 coupled to the shaft 206. The width (e.g., diameter) of the tapered end 210 decreases along its length.

The retainer 10 additionally includes at least one guide (e.g., first and second guides 52, 54) capable of facilitating (with the help of the tapered end 210) insertion of the shaft 206 through the body opening 14. In the depicted embodiment, the retainer 10 includes first and second guides 52, 54 extending from the retainer body 12 toward the center C of the retainer 10. Each of the first and second guides 52, 54 are configured as ramps and, accordingly, are obliquely angled relative to the retainer body 12. Regardless of their configuration, the first and second guides 52, 54 along with the tapered end 210 can facilitate inserting the shaft 206 through the body opening 14. In particular, the oblique angle defined between each of the first and second guides 52, 54 and the retainer body 12 can help guide the fastener 202 into the body opening 14. The first and second guides 52, 54 can also be referred to as self-alignment features because they help align the fastener 202 in the body opening 14 in relation to the retainer 10. As shown in FIG. 2, each of the first and second guides 52, 54 may be disposed between the first and second engaging protrusions 44, 46 and defines a first guide end 56 and a second guide end 58 opposite to the first guide end 56. The first guide ends 56 of the first and second guides 52, 54 are directly coupled to the retainer body 12, while the second guide ends 58 of the first and second guides 52, 54 are free. That is, the second guide ends 58 are not coupled to the retainer body 12 or any other portion of the retainer 10.

The retainer body 12 of the retainer 10 may additionally include at least one undulated surface 60 separated from the substantially planar parts of the retainer body 12. In the depicted embodiment, the retainer body 12 includes two undulated surfaces 60 that are each separated from the rest of the retainer body 12 by a gap 62. In operation, the undulated surfaces 60 can contact the panel 102 supported by the support portions 32 when the first and second legs 22, 24 are in the second position, thereby aiding to retain the panel 102 in place in relation to the retainer 10.

Figure 6:
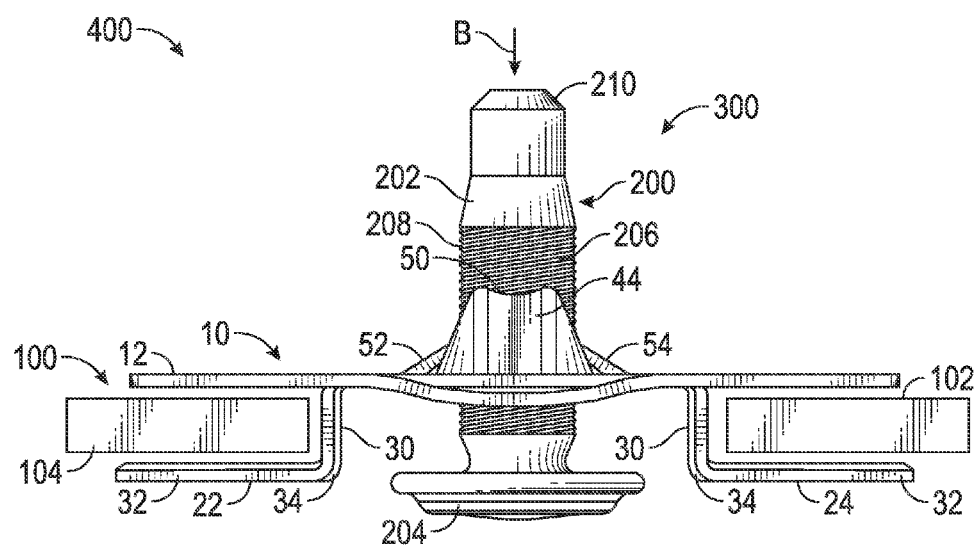
FIG. 6 is a schematic, side view of a retaining assembly including the retainer and the panel shown in FIG. 4 and a fastener inserted through the panel and the retainer.

The retainer 10 can hold the first component 100 and the second component 200. As discussed above, the first component 100 may be a panel 102, which may be part of an insulator of a vehicle, and the second component 202 may be a fastener 202 configured to couple the panel 102 to a third component. Therefore, the retainer 20 can be used to couple the panel 102 to the fastener 202. To do so, a user may employ the retaining method for retaining the fastener 202 in place relative to the panel 102 using the retainer 10 (i.e., the retaining method) as illustrated in FIGS. 3-6. First, the first and second legs 22, 24 are advanced toward the panel 102 in the direction indicated by arrow A (FIG. 3) while the first and second legs 22, 24 are in the first position. Specifically, the first and second legs 22, 24 are advanced through the panel opening 110 while the first and second legs 22, 24 are in the first position. The first and second legs 22, 24 should be advanced through the panel body 104 (via the panel opening 110) until the inner panel surface 108 partially or completely surrounds the connection portions 30 of the first and second legs 22, 24. Therefore, the retaining method entails advancing the first and second legs 22, 24 through the panel opening 110 until the inner panel surface 108 surrounds the connection portions 30 of the first and second legs 22, 24 (see FIGS. 3 and 4). Then, external forces F (FIG. 4) are applied to the first and second legs 22, 24 to bend the first and second legs 22, 24 from the first position (FIG. 3) to the second position (FIG. 4). Thus, the retaining method entails bending the first and second legs 22, 24 so that the first and second legs 22, 24 move relative to the retainer body 12 from the first position (FIG. 3) to the second position (FIG. 4). Specifically, external forces F are applied to the first and second legs 22, 24 to move the support portions 32 relative connection portions 30, thereby positioning the first and second legs 22, 24 in the second position. When the first and second legs 22, 24 are in the second position, the panel 102 is trapped between the retainer body 12 and the first and second legs 22, 24. While trapped between the retainer body 12 and the first and second legs 22, 24, the panel 102 can slightly move relative to the retainer 10 but it cannot be decoupled from the retainer 10. The slight relative movement between the retainer 10 and the panel 102 is important in order to take into account the tolerances of the panel 102 and the retainer 10. In other words, because of the tolerances on the dimensions of the retainer 10 and the panel 102, it is useful to allow slight relative movement between the panel 102 and the retainer 10 when the retainer 10 is holding the panel 102. Next, the retainer 10 and the panel 102 are moved together toward the second component 200 in the direction indicated by arrow B (FIG. 6). In particular, the retaining method entails moving the retainer 12, which is already coupled to the panel 102, toward the fastener 202 such that the fastener 202 extends through the body opening 14 (FIG. 2). Alternatively, the fastener 202 can be moved toward the retainer 10 and the panel 102 such that the fastener 202 extends through the retainer body 12 via the body opening 14. At this point, the threads 208 of the shaft 206 engage the first and second engaging protrusions 44, 46, thereby coupling the retainer 10 and the panel 10 to the fastener 202. Thus, the retaining method entails moving the retainer 10 and the panel 102 toward the fastener 102 such that the shaft 206 is disposed through the body opening 14 and the threads 208 contact the first and second engaging protrusions 44, 46 in order to couple the retainer 10 to the fastener 202. The fastener 202 can then be coupled to another component. The first component 100 (e.g., panel 102), the second component 200 (e.g., fastener 202), and the retainer 10 can be collectively referred to as the retaining assembly 300 when coupled to one another. The retaining assembly 300 may therefore include a first component 100, such as the panel 102, the second component 200, such as the fastener 202, and the retainer 10 interconnecting the first component 100 (e.g., panel 102) and the second component (e.g., fastener 202). In the retaining assembly 300, the panel opening 110 receives at least a portion of the fastener 202, such as the shaft 206, and the support portions 32 support the panel body 104 when the first and second legs 22, 24 are in the second position. The retaining assembly 300 may be part of a vehicle 400, such as a car or truck.

While the best modes for carrying out the invention have been described in detail, those familiar with the art to which this invention relates will recognize various alternative designs and embodiments for practicing the invention within the scope of the appended claims.

The invention claimed is:

1. A retaining assembly, comprising:
 a fastener;
 a panel including a panel body, the panel body defining an inner panel surface, the inner panel surface defining a panel opening extending through the panel body, and the panel opening at least partially receiving the fastener;
 a retainer interconnecting the panel and the fastener, the retainer including:
  a retainer body defining a body opening;
  at least one leg extending from the retainer body, the at least one leg being bendable relative to the retainer body between a first position and a second position upon application of an external force, wherein the at least one leg includes:
   a connection portion coupled to the retainer body;
   a support portion coupled to the connection portion;
   a bendable portion interconnecting the connection portion and the support portion, the bendable portion being bendable such that the at least one leg is movable relative to the retainer body between the first and second positions;
 wherein the panel opening is sized to receive the support portion and the connection portion when the at least one leg is in the first position; and
 wherein, when the at least one leg is in the second position, the inner panel surface surrounds the connection portion and the panel body is disposed between the support portion and the retainer body; and
 wherein, when the at least one leg is in the first position, the support portion is obliquely angled relative to the retainer body.

2. The retaining assembly of claim 1, wherein the retainer defines a center and further comprises engaging protrusions extending from the retainer body toward the center of the retainer.

3. The retaining assembly of claim 2, wherein the fastener includes a shaft and the engaging protrusions engage the shaft to couple the fastener to the retainer.

4. The retaining assembly of claim 3, wherein the shaft includes threads, and the threads mate with the engaging protrusions to couple the fastener to the retainer.

5. The retaining assembly of claim 2, wherein the body opening extends through the center of the retainer.

6. The retaining assembly of claim 3, further comprising at least one guide extending from the retainer body toward the center of the retainer.

7. The retaining assembly of claim 4, wherein the at least one guide is configured as a ramp and is obliquely angled relative to the retainer body.

8. The retaining assembly of claim 5, wherein the retainer body is substantially planar.

9. The retaining assembly of claim 6, wherein the connection portion is substantially planar and is substantially perpendicular to the retainer body regardless of whether the at least one leg is in the first position or the second position.

10. The retaining assembly of claim 7, wherein the bendable portion is configured as an elbow and has a curved shape.

11. A retainer assembly, comprising:
   a fastener;
   a panel including a panel body, the panel body defining an inner panel surface, the inner panel surface defining a panel opening extending through the panel body, and the panel opening at least partially receiving the fastener;
   a retainer interconnecting the panel and the fastener, the retainer including:
      a planar body defining a body opening;
      an undulated beam coupled to the planar body;
      at least one leg extending from the planar body, the at least one leg being bendable relative to the planar body between a first position and a second position upon application of an external force, wherein the at least one leg includes:
         a connection portion coupled to the planar body;
         a support portion coupled to the connection portion;
         a bendable portion interconnecting the connection portion and the support portion, the bendable portion being bendable such that the at least one leg is movable relative to the planar body between the first and second positions;
   wherein the panel opening is sized to receive the support portion and the connection portion when the at least one leg is in the first position; and
   wherein, when the at least one leg is in the second position, the inner panel surface surrounds the connection portion and the panel body is disposed between the support portion and the planar body.

12. The retainer assembly of claim 11, wherein a gap is defined between the undulated beam and the planar body.

13. The retainer assembly of claim 11, wherein the planar body has an inner body surface, the inner body surface defines an outer perimeter of the body opening, and the at least one leg extends from the planar body at a location spaced apart from the outer perimeter of the body opening.

14. The retainer assembly of claim 11, further comprising at least one ramp extending from the planar body toward a center of the retainer, wherein ramp is obliquely angled relative to the planar body, the fastener includes a shaft and a tapered end coupled to the shaft, and the tapered end and the at least one ramp are configured to facilitate insertion of the shaft through the body opening.

15. The retainer assembly of claim 11, wherein the retainer includes a first engaging protrusion extending from the planar body toward the center of the retainer and a second engaging protrusion extending from the planar body toward the center of the retainer, the first engaging protrusion is in a diametrically opposed relation with respect to the first engaging protrusion, each of the first engaging protrusion and the second engaging protrusion is obliquely angled relative to the planar body, the retainer further includes a first ramp extending from the planar body toward the center of the retainer and a second ramp extending from the planar body toward the center of the retainer, the first ramp is in a diametrically opposed relation with respect to the second ramp, the first ramp, the second ramp, the first engaging protrusion and the second engaging protrusion are circumferentially spaced apart from one another such that the first ramp, the second ramp, the first engaging protrusion and the second engaging protrusion surround the center of the retainer.

16. The retainer assembly of claim 11, wherein the planar body has an outer planar surface, the outer planar surface defines an outer perimeter of the planar body, and the outer perimeter is substantially circular.

* * * * *